(No Model.)

J. R. BINNS.
KNOB ATTACHMENT.

No. 303,610. Patented Aug. 19, 1884.

Witnesses
S. N. Piper
E. B. Pratt

Inventor
James Reuben Binns
by R. H. Eddy  att'y

UNITED STATES PATENT OFFICE.

JAMES REUBEN BINNS, OF SOUTH WINDHAM, CONNECTICUT.

KNOB ATTACHMENT.

SPECIFICATION forming part of Letters Patent No. 303,610, dated August 19, 1884.

Application filed May 5, 1884. (No model.)

*To all whom it may concern:*

Be it known that I, JAMES REUBEN BINNS, of South Windham, in the county of Windham, of the State of Connecticut, have invented a new and useful Improvement in Fastenings for Door-Knobs, &c.; and I do hereby declare the same to be described in the following specification and represented in the accompanying drawings, of which—

Figure 1:
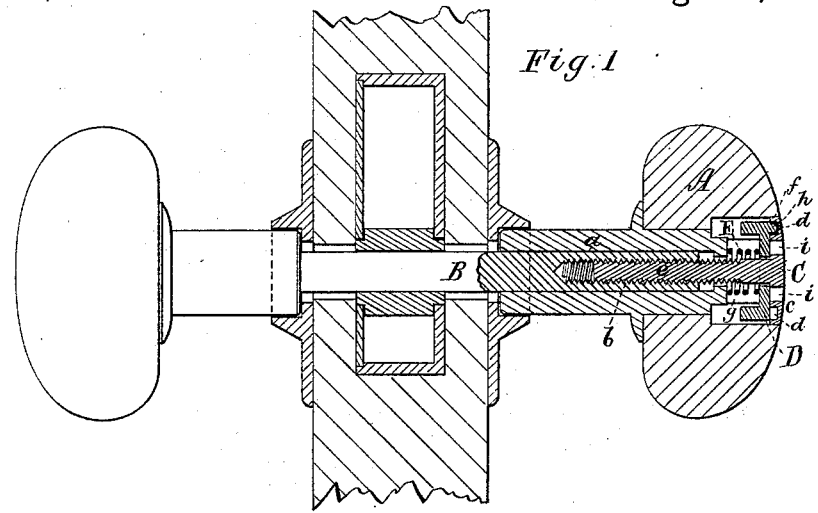
Figure 2:
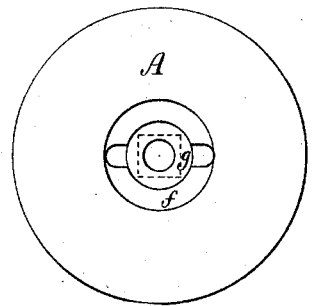
Figure 3:
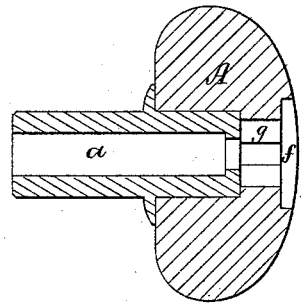
Figure 4:
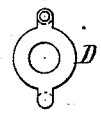
Figure 5:
Figure 6:
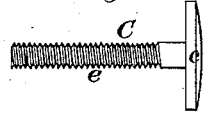
Figures 7, 8, 9:
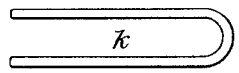

Figure 1 is a longitudinal section of a door-knob and its spindle provided with my invention or fastening, the nature of which is defined in the claim hereinafter presented. Fig. 2 is an end view, and Fig. 3 a transverse section, of the knob detached from the fastening-screw, clutch, and spring, to be described. Fig. 4 is an end view, and Fig. 5 an edge view, of the said clutch. Fig. 6 is a side view, Fig. 7 a longitudinal section, and Fig. 8 an inner end view, of the fastening-screw. Fig. 9 is a side view of the key employed in manipulating the clutch and screw of the fastening.

In such drawings, A denotes the knob, and B the prismatic spindle, the latter being extended within a correspondingly-prismatic socket, $a$, in the knob-shank, and provided with a female screw, $b$, which, arranged in the spindle lengthwise thereof, is to receive the fastening-screw C. The head $c$ of such screw C has opening out of its inner side a series of cavities, $d$, they being arranged at equal distances apart, and in a circle concentric with the shank $e$, which is screw-threaded to couple with the screw $b$. Furthermore, there is or may be within the head of the knob a circular recess, $f$, of the size and form of the screw-head, such recess being for reception of such head. There extends from the said recess into the knob-head a chamber, $g$, for the clutch D, such chambers and such clutch being shaped in a manner to admit of the clutch sliding within the chamber axially thereof, but not of revolving therein independently of the knob. From the clutch a tooth, $h$, projects, to enter some one of the cavities $d$ in the screw-head when the clutch is against such head. A spiral spring, E, encompassing the shank of the screw, is arranged so as to bear against the clutch and the bottom of its chamber $g$. Besides the series of cavities $d$ in the head of the screw, there are two holes, $i$, going through such head transversely, the holes being for reception of a furcated key or bent wire. (Shown at $k$ in Fig. 9.)

To connect the knob and spindle after inserting the latter within the knob-shank, the spring and clutch are to be placed, as represented, within the clutch-chamber of the knob, and the screw C is to enter the knob and be screwed into the spindle by means of the key inserted through the holes $i$ in the screw-head. While so setting the screw into the spindle, the clutch, by means of the key, is to be forced backward within its chamber, so as to keep the stud of the clutch out of engagement with the head of the screw. On such head abutting against the knob or having entered and fitted the recess $f$ in the knob-head, the key is to be withdrawn, in which case the clutch, by means of the spring, will be moved into engagement with the screw-head, and while in such condition will prevent the screw from being unscrewed in the spindle.

My invention will answer as a means of locking a nut on a screw, provided such nut have within it, in advance of its female screw-thread, a clutch-chamber, and with such a clutch, a spring, and a fastening-screw, as described, and there is within the bolt, upon which the nut may be screwed, a female screw to engage with the said fastening-screw. From this it will be seen that my invention can be employed as a "lock" for the nut of a screw-bolt, as occasion may require. It can also be used for securing various kinds of handles upon rods or shanks.

With my invention the knob and spindle can easily be adjusted to doors, as they may vary in thickness, it being supposed that besides the knob and its fastenings, as described, the spindle has another knob attached to it, as is common with the spindles of door-locks.

I do not claim a detached knob and neck in combination with a spindle when the said knob is provided with a screw fastened to the knob, and also with a latch, and the neck as constructed with one or more notches, by means of which and the said latch the knob and neck are coupled together, all as shown and described in the United States Patent No. 141,408, for in my knob attachment the screw is not fastened to the knob, but is separate therefrom, and provided with a recessed head, as described, and the knob and neck are not detached, but are attached or fastened together.

I claim—

The combination, with the knob provided with the clutch-chamber, and with an attached shank revoluble with such knob, and with the spindle having a female screw in it, as described, of the separate headed fastening-screw, and the clutch and spring, all being applied to operate substantially and for the purpose as set forth, there being in the head of such fastening-screw the key-holes and a series of cavities, and to the clutch a tooth to engage with either cavity of such series, as explained.

JAMES REUBEN BINNS.

Witnesses:
HUBER CLARK,
AMOS S. CHAPMAN.